United States Patent
Jacquin

(10) Patent No.: US 9,317,710 B2
(45) Date of Patent: *Apr. 19, 2016

(54) SYSTEM AND METHOD FOR SPECIFICATION AND ENFORCEMENT OF A PRIVACY POLICY IN ONLINE SERVICES

(71) Applicant: Xerox Corporation, Norwalk, CT (US)

(72) Inventor: Thierry Jacquin, St Martin d'Uriage (FR)

(73) Assignee: XEROX CORPORATION, Norwalk, CT (US)

( * ) Notice: Subject to any disclaimer, the term of this patent is extended or adjusted under 35 U.S.C. 154(b) by 320 days.

This patent is subject to a terminal disclaimer.

(21) Appl. No.: 14/141,548

(22) Filed: Dec. 27, 2013

(65) Prior Publication Data

US 2015/0186666 A1 Jul. 2, 2015

(51) Int. Cl.
G06F 3/00 (2006.01)
G06F 21/62 (2013.01)

(52) U.S. Cl.
CPC .................................. G06F 21/6227 (2013.01)

(58) Field of Classification Search
USPC .......................................... 726/1, 29; 380/28
See application file for complete search history.

(56) References Cited

U.S. PATENT DOCUMENTS

| 8,997,042 | B2 * | 3/2015 | Kew ............................... 717/116 |
| 2007/0055965 | A1 * | 3/2007 | Colyer .................... G06F 8/316 717/143 |
| 2007/0124723 | A1 * | 5/2007 | Chapman ................. G06F 8/316 717/106 |
| 2014/0109045 | A1 * | 4/2014 | Kew ......................... G06F 8/316 717/116 |
| 2014/0181787 | A1 * | 6/2014 | Hristov .................... G06F 8/316 717/106 |
| 2014/0282430 | A1 * | 9/2014 | Kew ......................... G06F 11/34 717/130 |
| 2015/0195083 | A1 * | 7/2015 | Jacquin ................... H04L 9/008 380/28 |

OTHER PUBLICATIONS

Kifer, et al. "A Rigorous and customizable framework for privacy" Proc. $31^{st}$ symposium on Principles of Database systems (PODS), 2012, pp. 77-88.

Lomas, N. "US Government Still Learning on Europe to Dilute Data protection Reform Proposals" TechCrunch, Jan. 18, 2013, Retrieved from http://techcrunch.com/2013/01/18/us-government-still-leaning-on-europe-to-dilute-data-protection-reform-proposals/ on Nov. 13, 2013, pp. 1-4.

Schwartz, P. "The EU-U.S. Privacy Collision: a turn to institutions and procedures" Harv. L. Rev. 126 (2013): 1966-2139.

(Continued)

*Primary Examiner* — Joseph P Hirl
*Assistant Examiner* — Sayed Beheshti Shirazi
(74) *Attorney, Agent, or Firm* — Fay Sharpe LLP

(57) ABSTRACT

A method for implementing a privacy policy includes receiving code for an application which includes definitions for a set of classes of records and for each of the record classes in the set, a definition of at least one field. A user selects one or more of the record classes and fields of the application as sensitive. A records manager is generated for identifying an associated minimization service for generating a minimized value of data in the sensitive field. A mapping aspect identifies joins in the application code where the minimization service is to be called. When the records manager and mapping aspect are deployed with the application, the minimization service generates a minimized value of data in the respective sensitive field.

16 Claims, 30 Drawing Sheets

(56) References Cited

OTHER PUBLICATIONS

APEC Secretariat. "APEC Privacy Framework" ISBN 981-05-4471-5, Retrieved from http://www.apec.org/Groups/Committee-on-Trade-and-Investment/~/media/Files/Groups/ECSG/05_ecsg_privacyframwk.ashx on Nov. 13, 2013, pp. 1-40.

"OECD Privacy Principles" Retrieved from http://oecdprivacy.org on Nov. 13, 2013, pp. 1-5.

"Consumer Data Privacy in a Networked World: A Framework for protecting privacy and promoting innovation in the global digital economy" The White House, Feb. 2012, pp. 1-62.

"Proposal for a Regulation of the European Parliament and of the Council on the Protection of Individuals with regards to the Processing of Personal Data and on the Free Movement of Such data" European Commission, Jan. 25, 2012, pp. 1-119.

Atrey, P. "A Secret Sharing based Privacy Enforcement Mechanism for Untrusted Social Networking Operators" MiFor'11, Nov. 29, 2011, pp. 13-18.

Casassa Mont, et al. "Privacy Policy Enforcement in Enterprises with Identity Management Solutions" PST 2006, Oct. 30-Nov. 1, 2006, pp. 1-12.

Simao, et al. "Jano—Specification and Enforcement of Location Privacy in Mobile and Pervasive Environments" M-MPAC 2010, Nov. 29, 2010, pp. 1-8.

* cited by examiner

```
Gdpf: "Generic Digital Privacy Framework "
            name=FQNV "written By " author = ID "for Service " providedService = FQN
            "in version: " providedServiceVersion = VERSION "-----\nMINIMIZATION/EXPANSION SERVICE DECLARATION:"
            (serviceTemplates += DMEService* "default is " persisentDefault=[DMEService])?
            "-----\nPRIVATE OBJECTS:"
            "User Related Records:" userClasses += PersonalRecord*
            "-----\nend of GDPF"
            ;

DMEService:
            'Minimization:' name=ID "version" version=VERSION ("on node" node=Node)?
                       "implementing" algo=STRING ('offering transparency levels'
levels+=TransparencyLevel+)?;

PersonalRecord:
            name=ID 'mapped-to' nativeClass=([types::JvmDeclaredType | FQN])
            ('persitency keys :' (idFields += [types::JvmField])+)?
            'FieldsToProtect :[' privateFields += PrivateField+ ']' ;

PrivateField:
'field:' field=[types::JvmField] 'exposed as' name=ID ( 'delegatedTo' delegation=[DMEService])?;

Node:
   'IP:' ip=IP_ADDRESS
            "virtual:" virtual=TrueFalse "secured:" secured=TrueFalse;

enum TrueFalse:
   true | false;

terminal IP_ADDRESS :
   INT '.' INT '.' INT '.' INT;

enum TransparencyLevel:
            transparent | fuzzy | veryfuzzy | semiopaque;

terminal VERSION :
            'M' INT '.m' INT '.i' INT ;

FQNV :
            FQN '.' VERSION ('.' ID)?;

FQN :
   ID ('.' ID)*;
```

FIG. 4

-----PRIVATE OBJECTS:
User Related Records: accountRecord mapped-to test.privac
persistency keys : id FieldsToProtect:{
    field:   address     exposed as PersonalAddress

FIG. 5

⊙ User Related Records: accountRecord mapped-to test.privacy.Account
persistency keys : id FieldsToProtect :[
    field: address exposed as PersonalAddress
    field: name exposed as name
    field: exposed as AccountID

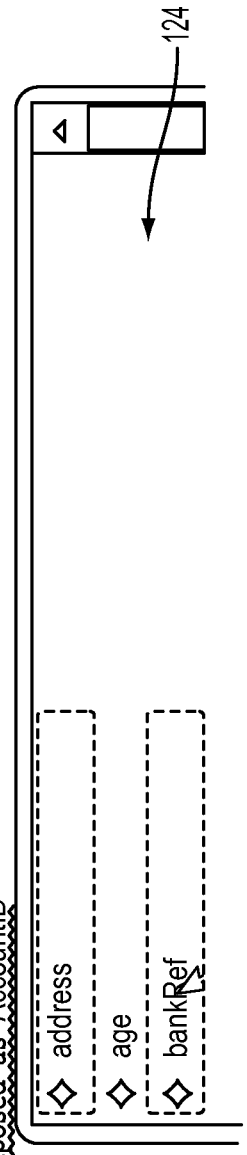

FIG. 6

```
public class TestApplicationGdpfPrivateRecordsManager extends
PrivateRecordsManagerRuntime {
        @Override
        public PrivateRecord mapRecordToPrivateRecord(Object appliRecord) throws
PrivacyConfigurationException{
                if (appliRecord instanceof test.privacy.Account){
                        PrivateAccount privateRecord =
                                        mapAccountToPrivateAccount((test.privacy.Account) appliRecord);
                        if (privateRecord.getRunner() == null) {
                                privateRecord.setRunner(getRunnerForRecord(privateRecord));
                        }
                        return privateRecord;
                }
                return super.mapRecordToPrivateRecord(appliRecord);
        }

PrivateAccount mapAccountToPrivateAccount(test.privacy.Account appliRecord)
                throws PrivacyConfigurationException {
                String persistencyKey = getPersistencyKey(appliRecord) ;
                PrivateAccount persistedRecord;
                if (recordsMap.get(persistencyKey)!= null) {
                        return (PrivateAccount) recordsMap.get(persistencyKey) ;
                }
                persistedRecord = (PrivateAccount) persistedRecordFor(persistencyKey);
                if (persistedRecord != null) {
                        recordsMap.put(persistencyKey, persistedRecord);
                        persistedRecord.setPrivacyManager(getPrivacyManager());
                        return persistedRecord;
                }
                persistedRecord = createPersistedRecord(appliRecord);
                recordsMap.put(persistencyKey, persistedRecord);
                persistedRecord.setPrivacyManager(getPrivacyManager());

persistedRecord.setCreatorID(getPrivacyManager().getServiceUserProbe().getCurrentUser().getId());
                GdpfPrivacyConfiguration config =
getPrivacyManager().getConfigurationManager().getPrivacyConfiguration();

if (config == null) {
                        throw new PrivacyConfigurationException("Record mapping problem: no privacy
configuration provided");
                }
                if (config.getDefinition().getUserClasses().size() == 0) {
                        throw new PrivacyConfigurationException("No declared private class in privacy
configuration");

```
            for ( PersonalRecord recordClass : config.getDefinition().getUserClasses()){
            persistedRecord = (PrivateAccount) persistedRecordFor(persistencyKey);
            if (persistedRecord != null) {
                    recordsMap.put(persistencyKey, persistedRecord);
                    persistedRecord.setPrivacyManager(getPrivacyManager());
                    return persistedRecord;
            }
            persistedRecord = createPersistedRecord(appliRecord);
            recordsMap.put(persistencyKey, persistedRecord);
            persistedRecord.setPrivacyManager(getPrivacyManager());

persistedRecord.setCreatorID(getPrivacyManager().getServiceUserProbe().getCurrentUser().getId());
            GdpfPrivacyConfiguration config =
getPrivacyManager().getConfigurationManager().getPrivacyConfiguration();

if (config == null) {
                    throw new PrivacyConfigurationException("Record mapping problem: no privacy
configuration provided");
            }
            if (config.getDefinition().getUserClasses().size() == 0) {
                    throw new PrivacyConfigurationException("No declared private class in privacy
configuration");

} for ( PersonalRecord recordClass : config.getDefinition().getUserClasses()){
                    if (recordClass.getNativeClass().getQualifiedName().equals("test.privacy.Account")){
                            persistedRecord.setApplicativeClass(recordClass);
                            break;
                    }
                    throw new PrivacyConfigurationException("Record mapping problem: no personnalRecord
associated");
            }
            return persistedRecord;
    }
    // with privacyByDefault, no need to retrieve the persistency metadata
    private Object persistedRecordFor(String persistencyKey) {
            return null;
    } if (recordClass.getNativeClass().getQualifiedName().equals("test.privacy.Account")){
                            persistedRecord.setApplicativeClass(recordClass);
                            break;
                    }
                    throw new PrivacyConfigurationException("Record mapping problem: no personnalRecord
associated");
            }
```

FIG. 7B

```
            return persistedRecord;
    }

// with privacyByDefault, no need to retrieve the persistency metadata
    private Object persistedRecordFor(String persistencyKey) {
            return null;
    } public static String getPersistencyKey(test.privacy.Account appliRecord){
            String key = "key";
            key += "_" + appliRecord.getId();
            return key;
    } public PrivateAccount createPersistedRecord(test.privacy.Account appliRecord){
            // should insert here all the user consent based hypothesis // finish with the default case: privacyByDefault
            return new PrivateAccount(appliRecord);
    } public boolean isManageable(test.privacy.Account record) {
            return true;
    } class PrivateAccount extends PrivateRecordImpl{ private Account appliRecord;
            public PrivateAccount(Account record) {
                    appliRecord = record;
                    applicativeRecord = record;
                    persistencyKey = TestApplicationGdpfPrivateRecordsManager.getPersistencyKey(record);
                    privacyID = "privacy.generic.framework.testApplication.M1.m0.i1";
            }

@Override
            public String minimizeStringField(String val, String fieldName) throws PrivacyConfigurationException {
                    FieldAccessEnforcementRunner fieldRunner = runner.getFieldRunner(fieldName);
                    return fieldRunner.setStringField(val, (PrivateRecord)this);
            }
```

FIG. 7C

```
@Override
public String expandStringField(String val, String fieldName) throws PrivacyConfigurationException {
        FieldAccessEnforcementRunner fieldRunner = runner.getFieldRunner(fieldName);
        return fieldRunner.getStringField(val, (PrivateRecord)this);
    }
}

@Override
public void configureRecordClass(PersonalRecord recordClass, Class<?> recordsManagerClass) throws PrivacyConfigurationException{
        // verify that the gdpf definition record had been considered by generation Class<?> c;
        try {
                JvmDeclaredType nativeClass = recordClass.getNativeClass();
                String className = nativeClass.getQualifiedName();
                c = Class.forName(nativeClass.getQualifiedName());
        } catch (ClassNotFoundException e) {
                e.printStackTrace();
                throw new PrivacyConfigurationException("Application And Gdpf are not aligned");
        }
        try {

//Method[] methods = recordsManagerClass.getMethods();
                if (recordsManagerClass.getMethod("isManageable", c) == null) {
                        throw new PrivacyConfigurationException("RecordManager And Gdpf are not aligned");
                }
        } catch (SecurityException e) {
                e.printStackTrace();
                throw new PrivacyConfigurationException("RecordManager And Gdpf are not aligned");

} catch (NoSuchMethodException e) {
                e.printStackTrace();
                throw new PrivacyConfigurationException("RecordManager And Gdpf are not aligned");
        }

// register this EnforcementRunner with the enforcementRunerManager
    }
}
```

FIG. 7D

```
@Override
        public PrivateRecordEnforcementRunner getRunnerForRecord(PrivateRecord
record) {
                    PrivateRecordsEnforcementManager enforcementManager =
enforcementManagerPerPersonalRecord.get(record.getApplicativeClass());

if (enforcementManager == null) {
                              enforcementManager =
PrivacyByDefaultFactory.eINSTANCE.createPrivateRecordsEnforcementManager();

enforcementManager.setPrivacyManager(getPrivacyManager());
                              Map<String,
com.xerox.ea.privacyByDefault.enforcement.PrivateRecordEnforcementRunner> table = new
HashMap<String, PrivateRecordEnforcementRunner>();

enforcementManager.setRecordEnforcersPerPrivacyID(table);

enforcementManagerPerPersonalRecord.put(record.getApplicativeClass(),
enforcementManager);
                    }
                    String policyID = record.getPrivacyID();
                    PrivateRecordEnforcementRunner runner = enforcementManager.

getRecordEnforcersPerPrivacyID().get(policyID);
                    if (runner == null) {
                              // try to load the specific policy from
                              // 1- the gdpf Policy first
                              // 2 - previous versions of the gdpf based on a
common name but previous version
                              Gdpf gdpf =
privacyManager.getConfigurationManager().getPrivacyConfiguration()
                                                        .getDefinition();
                              if (gdpf.getName().equals(policyID)) {
                                        runner = new
PrivateRecordEnforcementRunnerRuntime(gdpf, record, enforcementManager);
                              } else {
                                        // TODO get a previous version if
possible or raise PrivacyConfigurationException

} enforcementManager.getRecordEnforcersPerPrivacyID().put(policyID, runner);
                    }
                    return runner;
        }
```

FIG. 8

```
def compileRecordsManager(Gdpf gdpf) '''
package «gdpf.packaging».gdpf.runtime.«gdpf.version» ;

import com.xerox.ea.gdpf.configuration.PrivacyConfigurationException;
import com.xerox.ea.privacyByDefault.PrivacyByDefaultFactory;
import com.xerox.ea.privacyByDefault.PrivacyManager;
import com.xerox.ea.privacyByDefault.PrivateRecord;
import com.xerox.ea.privacyByDefault.PrivateRecordsEnforcementManager;

import com.xerox.ea.privacy.gdpf.gdpfDsl.Gdpf;
import com.xerox.ea.privacy.gdpf.gdpfDsl.PersonalRecord;
import com.xerox.ea.privacy.runtime.support.GdpfPrivacyManagerRuntime;
import com.xerox.ea.privacy.runtime.support.PrivateRecordsManagerRuntime;
import com.xerox.ea.privacyByDefault.configuration.GdpfPrivacyConfiguration;
import com.xerox.ea.privacyByDefault.enforcement.FieldAccessEnforcementRunner;
import com.xerox.ea.privacyByDefault.enforcement.PrivateRecordEnforcementRunner;
import com.xerox.ea.privacyByDefault.impl.PrivateRecordImpl;

public class «gdpf.modelName.toFirstUpper»GdpfPrivateRecordsManager extends
            PrivateRecordsManagerRuntime {

@Override
public PrivateRecord mapRecordToPrivateRecord(Object appliRecord) throws PrivacyConfigurationException{
        «FOR r : gdpf.userClasses»
                        if (appliRecord instanceof «r.nativeClass.qualifiedName»){
                                Private«r.nativeClass.simpleName» privateRecord = map«r.nativeClass.simpleName»ToPrivate«r.nativeClass.simpleName»((«r.nativeClass.qualifiedName») appliRecord);
                                if (privateRecord.getRunner() == null) {
                                        privateRecord.setRunner(getRunnerForRecord(privateRecord));
                                }
                                return privateRecord;
                        }
        «ENDFOR»
        return super.mapRecordToPrivateRecord(appliRecord);
}
                        «FOR r : gdpf.userClasses»
                        Private«r.nativeClass.simpleName»
    map«r.nativeClass.simpleName»ToPrivate«r.nativeClass.simpleName»(«r.nativeClass.getQualifiedName()» appliRecord)
                        throws PrivacyConfigurationException {
String persistencyKey = getPersistencyKey(appliRecord) ;
                                Private«r.nativeClass.simpleName» persistedRecord;
```

FIG. 9A

```
                    if (recordsMap.get(persistencyKey)!= null) {
                                    return (Private«r.nativeClass.simpleName»)
recordsMap.get(persistencyKey) ;
                                    } persistedRecord = (Private«r.nativeClass.simpleName»)
persistedRecordFor(persistencyKey);
                                    if (persistedRecord != null) {
                                            recordsMap.put(persistencyKey, persistedRecord);
                                            persistedRecord.setPrivacyManager(getPrivacyManager());
                                            return persistedRecord;
                                    }
                                    persistedRecord = createPersistedRecord(appliRecord);
                                    recordsMap.put(persistencyKey, persistedRecord);
                                    persistedRecord.setPrivacyManager(getPrivacyManager());
            persistedRecord.setCreatorID(getPrivacyManager().getServiceUserProbe().getCurrentUser().getId());
                                            GdpfPrivacyConfiguration config =
getPrivacyManager().getConfigurationManager().getGdpfPrivacyConfiguration();

if (config == null) {
                                            throw new PrivacyConfigurationException("Record mapping problem: no
privacy configuration provided");

}
                                    if (config.getDefinition().getUserClasses().size() == 0) {
                                            throw new PrivacyConfigurationException("No declared private class in
privacy configuration");

}
                                    for ( PersonalRecord recordClass : config.getDefinition().getUserClasses()){
                                            if
(recordClass.getNativeClass().getQualifiedName().equals("«r.nativeClass.qualifiedName»")){
                                                    persistedRecord.setApplicativeClass(recordClass);
                                                    break;
                                    }
                                    throw new PrivacyConfigurationException("Record mapping problem: no personnalRecord
associated");
                            }
                                    return persistedRecord;
                            }
                                    // with privacyByDefault, no need to retrieve the persistency metadata
                                    private Object persistedRecordFor(String persistencyKey) {
                    return null;
                            }
                            public static String
getPersistencyKey(«r.nativeClass.getQualifiedName()» appliRecord){
                                    String key = "key";
```

FIG. 9B

```
                                        «FOR field : r.idFields»
                                                key += "_" + appliRecord.get«field.simpleName.toFirstUpper»();
                                        «ENDFOR»
                                        return key;
                                } public Private«r.nativeClass.simpleName»
createPersistedRecord(«r.nativeClass.getQualifiedName()» appliRecord){
                                        // should insert here all the user consent based hypothesis // finish with the default case: privacyByDefault
                                        return new Private«r.nativeClass.simpleName»(appliRecord);
                                } public boolean isManageable(«r.nativeClass.qualifiedName» record) {
                                        return true;
                                }
                «ENDFOR»

«FOR r : gdpf.userClasses»
                class Private«r.nativeClass.simpleName» extends PrivateRecordImpl{ private «r.nativeClass.getQualifiedName()» appliRecord;
                                        public Private«r.nativeClass.simpleName»(«r.nativeClass.getQualifiedName()» record) {
                                                appliRecord = record;
                                                applicativeRecord = record;
                                                persistencyKey =
«gdpf.modelName.toFirstUpper»GdpfPrivateRecordsManager.getPersistencyKey(record);
                                                privacyID = "«gdpf.name»";
                                        }

@Override
                                        public String minimizeStringField(String val, String fieldName) throws
PrivacyConfigurationException {
                                                FieldAccessEnforcementRunner fieldRunner = runner.getFieldRunner(fieldName);
                                                return fieldRunner.setStringField(val, (PrivateRecord)this);
                                        }

@Override
                                        public String expandStringField(String val, String fieldName) throws
PrivacyConfigurationException {
                                                FieldAccessEnforcementRunner fieldRunner = runner.getFieldRunner(fieldName);
                                                return fieldRunner.getStringField(val, (PrivateRecord)this);
                                        }
                                }
                        }
                «ENDFOR»
```

FIG. 9C

| *testApplication.gdpf | ✖ | consent.priveacy | services.priveacy | distribution.priveacy |

```
Generic Digital Privacy Framework
privacy.generic.framework.testApplication.M1.m0.i1
written By tj for Service standalone_test_v1_0_9
in version: M1.m2.i3
----- MINIMIZATION/EXPANSION SERVICE DECLARATION:
Minimization: minim version M1.m1.i1 on node IP: 127.0.0.1 virtual: false secured:true
implementing 'binary' offering transparency levels fuzzy semiopaque transparent
default is minim
```
⎫
⎬ 180
⎭

```
----- PRIVATE OBJECTS:
⊙ User Related Records: accountRecord mapped-to test.privacy.Account
persitency keys : id FieldsToProtect :[
    field: address exposed as PersonalAddress
    field: name exposed as name
    field: bankRef exposed as AccountID
]
```
⎫
⎬ 182
⎭

```
----- end of GDPF
```

FIG. 10

▲ 🗎 MinexpService - > Minimizer, Expander
    (♦) Minimizer
    (♦) Expander
  ▷ ⇒ implementing : DMEService
▲ 🗎 Minimizer
  ▲ ⊚ minimizeString(PrivateRecord, EString, EString) : EString
    ▷ ⊷ privateRecord : PrivateRecord
    ▷ ⊷ fieldName : EString
    ▷ ⊷ legacyValue : EString
      (:) EString
  ▲ ⊚ minimizeString(EString, EString, EString, EString, EString) : EString
    ▷ ⊷ creatorID : EString
    ▷ ⊷ className : EString
    ▷ ⊷ recordID : EString
    ▷ ⊷ fieldName : EString
    ▷ ⊷ legacyValue : EString
      (:) EString

```
package privacy.generic.framework.gdpf.aspect.M1.m0.i1 ;
import privacy.generic.framework.gdpf.runtime.M1.m0.i1.TestApplicationGdpfPrivateRecordsManager;
import com.xerox.ea.gdpf.configuration.PrivacyConfigurationException;
import com.xerox.ea.privacyByDefault.PrivateRecord;

import com.xerox.ea.privacyByDefault.PrivateRecordsManager;

public aspect TestApplicationRecordsMapper { static private PrivateRecordsManager recordsManager;

static public void setRecordsManager(PrivateRecordsManager mgr) {
                recordsManager = mgr;
        } static public PrivateRecordsManager getRecordsManager() {
                return recordsManager;
        }
//<account> record aspects for (1) creation and (2) protected fields access
        public pointcut accountCreation() :
                call(test.privacy.Account.new(String));

after() returning (test.privacy.Account account): accountCreation() {
                this.recordsManager.getRecordsMap();
                try {
                        this.recordsManager.mapRecordToPrivateRecord(account);
                } catch (PrivacyConfigurationException e) {
                        // TODO Auto-generated catch block
                        e.printStackTrace();
                }
        } public pointcut accountSetField(String value) :
                set(String test.privacy.Account.*) &&
                        (!cflow(adviceexecution()))&&
                        args(value);

void around(String val) : accountSetField(val) {
                recordsManager = getRecordsManager();
                PrivateRecord privateAccount;
                try {
                        privateAccount =
recordsManager.mapRecordToPrivateRecord(thisJoinPoint.getTarget());
                        String fieldName = thisJoinPoint.getSignature().getName();
                        String minimizedValue = privateAccount.minimizeStringField(val, fieldName);
                        proceed(minimizedValue);
                } catch (PrivacyConfigurationException e) {
                        // TODO Auto-generated catch block
                        e.printStackTrace();
                }
        }
//</account>
}
```

FIG. 12

```
def compileRecordsAspect(Gdpf gdpf) '''
package «gdpf.packaging».gdpf.aspect.«gdpf.version»;
import
«cdpf.packaging».gdpf.runtime.«gdpf.version».«gdpf.modelName.toFirstUpper»GdpfPrivateRecordsMan
ager;
import com.xerox.ea.gdpf.configuration.PrivacyConfigurationException;
import com.xerox.ea.privacyByDefault.PrivateRecord;

import com.xerox.ea.privacyByDefault.PrivateRecordsManager;

public aspect «gdpf.modelName.toFirstUpper»RecordsMapper { static private PrivateRecordsManager recordsManager;

static public void setRecordsManager(PrivateRecordsManager mgr) {
                recordsManager = mgr;
        } static public PrivateRecordsManager getRecordsManager() {
                return recordsManager;
        }

«FOR uc : gdpf.userClasses»
        //«uc.nativeClass.simpleName.toFirstLower» record aspects for (1) creation and
(2) protected fields access
                public pointcut «uc.nativeClass.simpleName.toFirstLower»Creation() :
                        call(«uc.nativeClass.qualifiedName».new(String));

after() returning («uc.nativeClass.qualifiedName»
«uc.nativeClass.simpleName.toFirstLower») : «uc.nativeClass.simpleName.toFirstLower»Creation() {
                        this.recordsManager.getRecordsMap();
                        try {
        this.recordsManager.mapRecordToPrivateRecord(account);
                        } catch (PrivacyConfigurationException e) {
                                // TODO Auto-generated catch block
                                e.printStackTrace();
                        }
                }
```

FIG. 13A

```
public pointcut «uc.nativeClass.simpleName.toFirstLower»SetField(String value) :
                        set(String test.privacy.Account.*) &&
                                (!cflow(adviceexecution()) &&
                                args(value);

void around(String val) : accountSetField(val) {
                        recordsManager = getRecordsManager();
                        PrivateRecord privateAccount;
                        try {
                                privateAccount =
recordsManager.mapRecordToPrivateRecord(thisJoinPoint.getTarget());
                                String fieldName =
thisJoinPoint.getSignature().getName();
                                String minimizedValue =
privateAccount.minimizeStringField(val, fieldName);
                                proceed(minimizedValue);
                        } catch (PrivacyConfigurationException e) {
                                // TODO Auto-generated catch block
                                e.printStackTrace();
                        }
                }
        //</«uc.nativeClass.simpleName.toFirstLower»>
        «ENDFOR»
}
```

FIG. 13B

```
@Override
public PrivateRecordEnforcementRunner getRunnerForRecord(PrivateRecord record) {
    PrivateRecordsEnforcementManager enforcementManager =
            enforcementManagerPerPersonalRecord.get(record.getApplicativeClass());

if (enforcementManager == null) {
        enforcementManager = PrivacyByDefaultFactory.eINSTANCE.createPrivateRecordsEnforcementManager();
        enforcementManager.setPrivacyManager(getPrivacyManager());
        Map<String, com.xerox.ea.privacyByDefault.enforcement.PrivateRecordEnforcementRunner> table =
                new Hashmap<String, PrivateRecordEnforcementRunner>();
        enforcementManager.setRecordEnforcersPerPrivacyID(table);
        enforcementManagerPerPersonalRecord.pur(record.getApplicativeClass(), enforcementManager);
    }
    String policyID = record.getPrivacyID();
    PrivateRecordEnforcementRunner runner = enforcementManager.
            getRecordEnforcersPerPrivacyID().get(policyID);
```

FIG. 15

```
persistedRecord = (PrivateAccount) persistedRecordFor(persistencyKey);
if (persistedRecord != null {
    recordsMap.put(persistencyKey, persistedRecord);
    persistedRecord.setPrivacyManager(getProvacyManager());
    return persistedRecord;
}
persistedRecord = createPersistedRecord(appliRecord);
recordsMap.put(persistencyKey, persistedRecord);
persistedRecord.setPrivacyManaher(getPrivacyManager());
persistedRecord.setCreatorID(getPrivacyManager().getSerciceUserProbe().getCurrentUser().getId());
```

FIG. 16

```
if (runner == null) {
    // try to load the specific policy from
    //1- the gdpf Policy first
    //2 - previous versions of the gdpf based on a common name but previous version
    Gdpf gdpf = privacyManager .getConfigurationManager() .getPrivacyConfiguration(policyID)
        .getDefinition();
    if (gdpf .getName() .equals(policyID)) {
        runner = new PrivateRecordEnforcementRunnerRuntime(gdpf, record, enforcementManager);
    } else {
        // TODO get a previous version if possible or raise PrivacyConfigurationException
    }
    enforcementManager.getRecordEnforcersPerPrivacyID() .put(policyID, runner);
}
return runner;
}
```

FIG. 17

```
public PrivateRecordEnforementRunnerRuntime(Gdpf gdpf, PrivateRecord record, PrivateRecordsEnforcementManager enforcementManager) {
    recordClass = record.getApplicationClass();
    this.enforcementManager = enforcementManager;
    setRunnersPerFieldName(new HashMap<String, FieldAccessEnforcementRunner>());
    for (JvmField f : recordClass.getPrivateFields()) {
        Field AccsssEnforcementRunner far;
        try {
            far = createFieldAccessEnforcer(recordClass,f);
            getRunnersPerFieldName().put(f.getSimpleName(), far);
        } catch (PrivacyCon figurationException e) {
            // TODO Auto-generated catch block
            e.printStackTrace();
        }
    }
}
```

FIG. 18

```
FieldAccessEnforcementRunner far = null;

PrivacyConfigurationManager cfgManager = get(EnforcementManager().
    getPrivacyManager().getConfigurationManager();
DMEService dfltMEService = cfgManager.getPrivacyConfiguration().
    getdefinition().getPersistentDefault();
DMEService meService = f.getDelegation();
if (meService == null) {
    meService = dfltMEService;
}
if (meService != null) {
    // twocases
    // 1- there is a defined node for the service, and it is not localhost
    //    then we use a r-osgi connection to a remote persistent minexp service
    // 2- there is none, then we use a local persistent minexpservice
    if ((meService.getNode() !=null) && (!dfltMEService.getNode().equals("127.0.0.1"))){
        //TODO manage the remote connection, only local service
        far = new ServiceClientFieldAccessEnforcementRunner(record, f.getField(), meService);
    } else {
        far=new LocalPersistentFieldAccessEnforcementRunner(record, f.getField(), meService)
    }
} else { // by default, colatile minimization service, plain values will be lost, very radical.
    far =
        new FieldAccessEnforcementRunnerRuntime(recordClass, f.getField());
} far.setFieldName(f.getField().getSimpleName());
return far;
```

FIG. 19

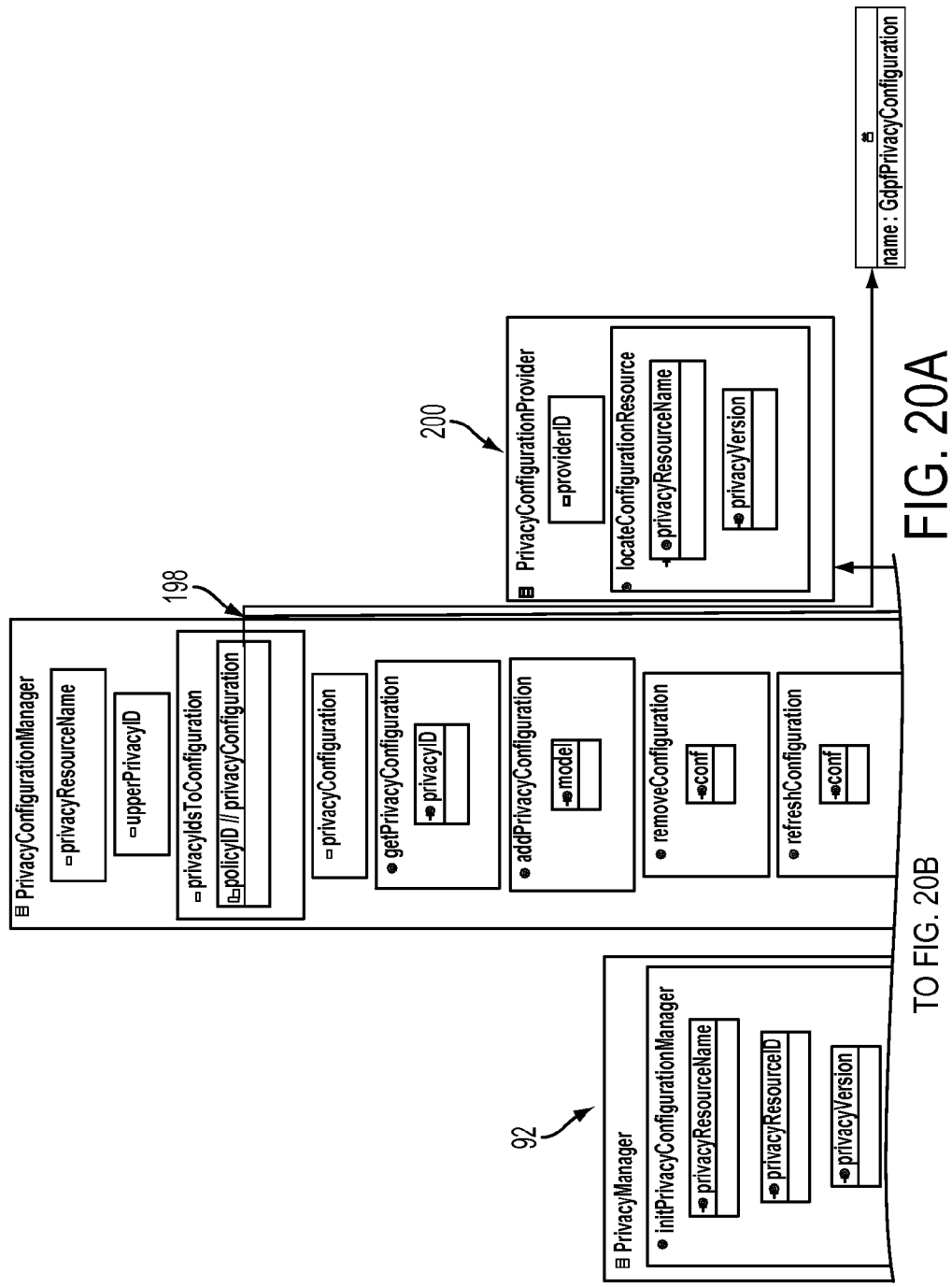

| *testApplication.gdpf | ✖ | consent.priveacy | services.priveacy | distribution.priveacy |

Generic Digital Privacy Framework
privacy.generic.framework.testApplication.M1.m0.i1
written By tj for Service standalone_test_v1_0_9
in version: M1.m2.i3
----- MINIMIZATION/EXPANSION SERVICE DECLARATION:
Minimization: minim version M1.m1.i1 on node IP: 127.0.0.1 virtual: false secured:true
implementing 'binary' offering transparency levels fuzzy semiopaque transparent
default is minim ----- PRIVATE OBJECTS:
User Related Records: accountRecord mapped-to test.privacy.Account
persitency keys : is FieldsToProtect :[
    field: adresse exposed as PersonalAdresse
    field: name exposed as name
    field: bankRef exposed as AccountID
]

----- end of GDPF

FIG. 21

```
public class LocalPersistentFieldAccessEnforcementRunner extends
    FieldAssessEnforcementRunnerImpl implements
    FieldAccessEnforcementRUnner { public LocalPersistentFieldAccessEnforcementRunner(PrivateRecord record,
        JvmField f, DMEService desc) throws PrivacyConfigurationException {
        if (getMinexpService() == null) {
            minexpService = searchForLocalMinexpService(desc);
        }
        if (minexpService == null) {
            throw new PrivacyConfigurationException("No LocalMinexpService corresponding to configuration");
        }
    } private MinexpService searchForLocalMinexpService(DMEService desc) {
        BundleContext osgiContext = Activator.getOsgiContext();
        if (osgiContext == null) {
            // not started as an application, go through the frameworkUtil
            Bundle bundle = FrameworkUtil.getBundle(GdpfDslFactory.class);
            if (bundle != null) {
                osgiContext = bundle.getBundleContext();
            }
        }
        if (osgiContext != null) {
            ServiceReference<MinexpService> reference =
                osgoContext.getServiceReference(MinexpService.class);
            if (reference !=null) {
                MinexpService proxy =
                    osgiContext.getService(reference);
                if (proxy != null) {
                    return proxy;
                }
            }
        }
        return new LocalMinexpService(desc);
    }
}
```

FIG. 22

```
package test.privacy;

import javax.persistence.Column;

@Entity
@Inheritance(strategy = InheritanceType.SINGLE_TABLE)
@DiscriminatorColumn(name = "RECORD_TYPE", discriminatorType = DiscriminatorType.STRING, length = 11)
@DiscriminatorValue("plain")
public class Account {

@Id
    @GeneratedValue(strategy = GenerationType.AUTO)
    private long id;

protected String name;

public String adresse;

public int age;

public String bankRef;

public Account(String name) {
        this.name = name;
    } public long getId() {
        return id;
    } public String getName() {
        return name;
```

SYSTEM AND METHOD FOR SPECIFICATION AND ENFORCEMENT OF A PRIVACY POLICY IN ONLINE SERVICES

BACKGROUND

The exemplary embodiment relates to a system and method for maintaining the privacy of personal information and finds particular application in connection with online services.

Most online (webserver) applications are not built to ensure protection of personal information. Several regulatory bodies, for example the European Union, are drafting regulations to require online service provides to explicitly ask users for the users' consent for use of the users' information. See, for example, "Proposal for a Regulation of the European Parliament and of the Council on the Protection of Individuals with regard to the Processing of Personal Data and on the Free Movement of Such Data," European Commission (Jan. 25, 2012).

The privacy-by-design approach is a generic software engineering principle stating that in development of an online service, the protection of private data is to be considered as a feature from its initial design to implementation. In particular, the proposed EU regulation requires assuming that, when the privacy feature is not considered, data protection must be guaranteed at the most restrictive requirement possible. i.e., there should be no use of the data. This requirement is known as privacy by default. In other words, every record of the application containing information about a person is considered as private and cannot be communicated or used without explicit authorization of the owner of the data. This extreme requirement makes existing online businesses difficult to conduct since the existing software infrastructure often has not been developed with privacy guarantees in place.

A method and system are described which address the problems of integrating privacy requirements into an existing application.

BRIEF DESCRIPTION

In accordance with one aspect of the exemplary embodiment, a method for implementing a privacy policy includes receiving code for an application which includes definitions for a set of classes of records and for each of the record classes, a definition of at least one field, receiving a selection of at least one of the fields of the application that is designated by a user as a sensitive field, and with a processor, based on the selection, generating a records manager and a mapping aspect. The records manager includes a private class definition corresponding to each record class that includes at least one of the fields designated as a sensitive field, the private class definition identifying an associated minimization service for generating a minimized value of data in the sensitive field. The mapping aspect includes pointcuts for identifying joins at which the records manager is to augment the functioning of the application code by calling the minimization service to generate a minimized value of data in the respective sensitive field, the records manager and mapping aspect being configured to be deployed when the application is run, whereby the minimization service generates a minimized value of data in the respective sensitive field.

In another aspect a system for implementing a privacy policy includes memory which stores code for an application which includes definitions for a set of classes of records and for each of the record classes, a definition of at least one field. An editor receives a selection of at least one of the fields of the application that is designated by a user as a sensitive field. A records manager generator generates a records manager, the records manager including a private class definition corresponding to each of the records classes that includes at least one of the fields designated as a sensitive field. The private class definition identifies an associated minimization service for generating a minimized value of data in the respective sensitive field. A mapping aspect generator generates a mapping aspect. The mapping aspect including pointcuts identifying joins at which the records manager is to augment the functioning of the application code by calling the minimization service to generate a minimized value of data in the respective sensitive field, the records manager and mapping aspect being configured to be deployed when the application is run, whereby the minimization service generates a minimized value of data in the respective sensitive field.

A processor may implement at least one of the editor, records manager generator, and the mapping aspect generator.

In another aspect, a method for implementing a privacy policy includes providing in memory a records manager and a mapping aspect. The records manager includes a private class definition corresponding to each record class of an application that includes at least one field that has been designated as a sensitive field, the private class definition identifying an associated minimization service for generating a minimized value of data in the sensitive field. The mapping aspect includes pointcuts for identifying joins at which the records manager is to augment the functioning of code of the application by calling the minimization service to generate a minimized value of data in the respective sensitive field. The method further includes deploying the records manager and mapping aspect together with the application code, whereby the minimization service generates a minimized value of data in the sensitive field. The deployment may be performed with a processor.

BRIEF DESCRIPTION OF THE DRAWINGS

FIG. 4 illustrates a generic digital privacy framework (gdpf) specification;

FIG. 5 is an illustration of a screenshot during selection of a sensitive class;

FIG. 6 is an illustration of a screenshot during a selection of a sensitive field;

FIG. 7 (split into consecutive FIGS. 7A, 7B, 7C and 7D) illustrates code for an example record manager class;

FIG. 8 illustrates example code for a registration function (entitled getRunnerForRecord) from a records manager class definition;

FIG. 9 (split into consecutive FIGS. 9A, 9B, and 9C) illustrates example code for a records manager generator;

FIG. 10 is an illustration of the definition of a minimization service and a definition of a private class;

FIG. 11 is an interface of a minimizer class;

FIG. 12 illustrates mapping aspect source code;

FIG. 13 (split into consecutive FIGS. 13A and 13B) illustrates an example mapping aspect source code generator in Xtend;

FIG. 15 illustrates exemplary source code for creation of an enforcement manager;

FIG. 16 illustrates exemplary source code for identification of a privacy policy to be considered by the records manager at mapping time;

FIG. 17 illustrates exemplary source code for creation of a record enforcement runner, where none was discovered for a record, by an enforcement manager associated with the record;

FIG. 18 illustrates exemplary source code for creation of runners;

FIG. 19 illustrates dynamically initializing a field access enforcement runner from the specification;

FIG. 21 illustrates an example application configuration at runtime including initialization of the privacy manager of FIG. 2, and loading the gdpf model;

FIG. 22 illustrates an example of a generated records manager (PrivateRecordsManager); and FIG. 23 is an example definition of a legacy class to be protected.

DETAILED DESCRIPTION

The exemplary embodiment relates to a method and apparatus for modifying an existing application to provide privacy protection by minimizing access to data in a set of sensitive record classes, each record in a sensitive class including at least one field which is designated as a sensitive field, e.g., by minimizing the visibility of data at inception time, and delegating the storage of the full visible data to an external dedicated minimization service. Aspects of the exemplary embodiment provide for identifying and receiving a selection of one or more record classes and corresponding fields which contain private information. The method is particularly suited to implementation in languages which allow additional code (e.g., as bytecode) to be added to an application after compilation using, for example, aspect programming joins. Such languages include Java and C#. The system allows a user to select a set of record classes as sensitive and, for each selected class, also to select which fields (or member variables) of the records in each of the selected record classes are sensitive fields. A records manager is generated which controls access to the information in the designated sensitive fields of the records which are in the designated sensitive record classes. Access to a constructor of the sensitive class and "set" function of the fields can be controlled using aspect programming joins.

The exemplary method establishes a reasonable tradeoff between an online services provider's economic constraints and the data protection required by a privacy policy that is set by the service provider and/or by a regulatory body. It allows retrofitting privacy into an existing application with minimal development.

The exemplary method proceeds in two stages. The first stage includes, for records of an existing application, specifying one or more record classes that are sensitive record classes (or types), each record class including one or more of the records. Additionally, for each of the specified sensitive classes, the method includes specifying which fields of those records that are in the sensitive record class are sensitive (contain private data). The sensitive record classes and fields are modeled and a records manager is generated which is configured to delegate the management of the data in the sensitive fields to a minimization service which is responsible for storing the particular value separately from the other data of the application and minimizing the data in the fields at a level of fuzziness required by the model for the applicative usage. In the second stage, the records manager is run with the existing code of the application.

Figure 1:
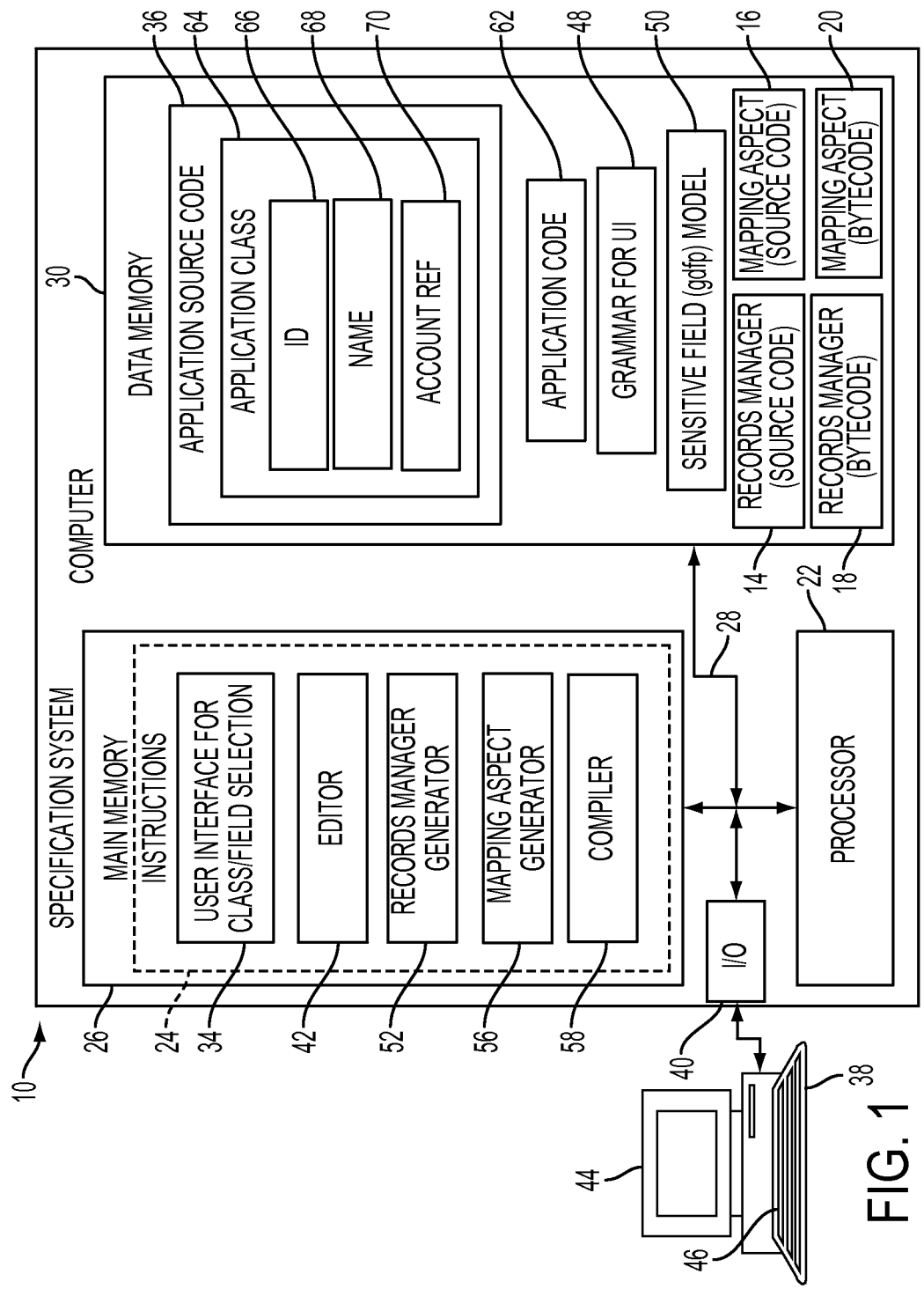
FIG. 1 is a functional block diagram of a code generation system in accordance with one aspect of the exemplary embodiment.
Figure 2:
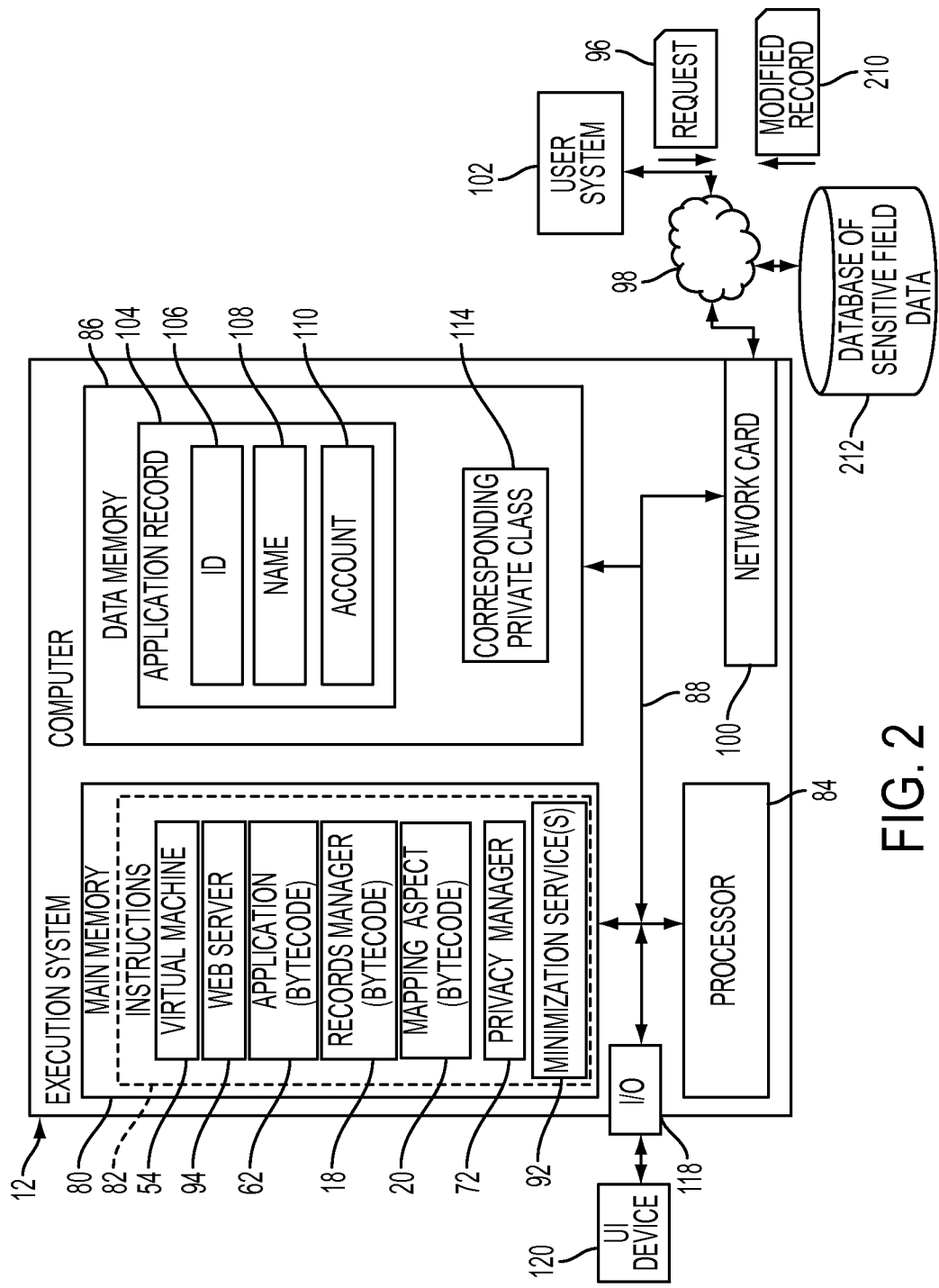
FIG. 2 is a functional block diagram of an execution system in accordance with one aspect of the exemplary embodiment.
Figure 3:
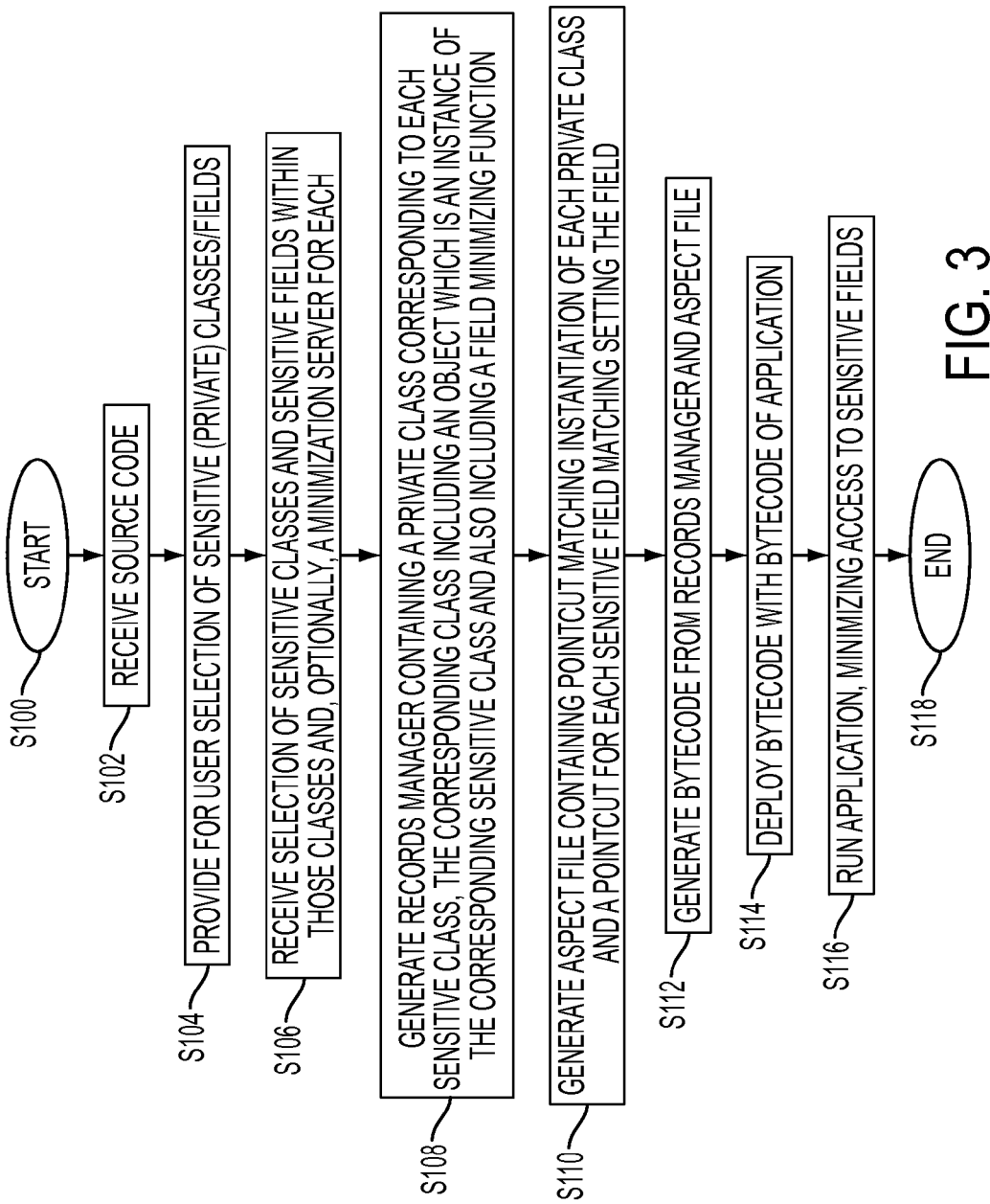
FIG. 3 is a flow chart illustrating a method of generating and running a privacy by default enabled application.

FIGS. 1 and 2 show functional block diagrams of computer-implemented specification and application execution systems 10, 12 suitable for performing the exemplary method disclosed with respect to FIG. 3. FIG. 1 shows a specification system 10 configured to generate source code instructions 14, 16, and to compile the source code to form a records manager 18 and a mapping aspect 20, respectively, which may each include instructions in a suitable code, such as bytecode. FIG. 2 shows a system 12 for executing the application and the generated bytecode. While these are shown as separate systems, it is to be appreciated that they may be combined into a single system. Other computer systems may be configured and connected to provide other services, such as databases for persistent storage, web servers, and application logic servers to provide the logic for web servers.

With regard to FIG. 1, the system 10 includes a computer processing device (or "processor") 22 which controls the overall operation of the system 10 by execution of processing instructions 24 which are stored in an instruction memory 26 connected to processor 12 by a bus 28. The processor 22 also accesses data memory 30 through bus 28 to manipulate data contained in the data memory 30. Instruction memory (main memory) 26 stores instructions 24 for several software components. Specifically, a user interface software component 34 generates a user interface to interact with a user. This allows the user to identify sensitive fields in application source code 36, which may be temporarily stored in memory 30. The user may interact with the computer system 10 via a user interface device 38 which connects to the system via an input/output (I/O) unit 40. The user may use a source code editor 42 (such as Eclipse™ or Microsoft™ Visual Studio™) to specify the record classes and fields to be subject to the privacy policy, which is separate or combined with U/I software 34.

The UI device 38 may include a display device 44, such as an LCD screen or computer monitor, and an input device 46, such as a keyboard, touchscreen, mouse or other cursor control device. There may be multiple UI devices. In addition to the I/O unit 40, the system 10 may include a network interface card (NIC) to connect system 10 to other systems by a network, e.g., a local area network (LAN) or wide area network (WAN) such as the Internet. The I/O unit 40 and/or NIC may connect via a wireless or wired connection.

To facilitate the user's identification of the sensitive classes of records and the sensitive fields, the source code editor 42 may load a grammar 48 to identify possible fields and provide user interface elements, such as various screens, a dropdown menu, or the like. The grammar may be written with a domain-specific language generator, such as Xtext. The exemplary grammar 48 is a textual grammar, referred to herein as 'gdpf' for Generic Digital Privacy Framework, expressed in a number of rules which identify fields that are likely to contain private data. From the sensitive fields identified by the user, code editor 42 may be used (e.g., also using Xtext) to generate a model 50 listing the sensitive fields and tracking the record classes which contain the sensitive fields. A records manager generator 52 generates the source code 14 for the records manager (RM or RecordsManager) class using, a general-purpose programming language for a virtual machine 54 (FIG. 2), such as for example, Xtend in the case of a Java Virtual Machine. A mapping aspect generator 56 generates mapping aspect source code 16, e.g., also using Xtend. As will be appreciated, the same software component can serve as the records manager generator 52 and mapping aspect generator 56.

Once the records manager source code 14 and mapping aspect source code 16 have been generated, a compiler 58 (e.g., a Java programming compiler or Microsoft C# compiler) compiles each file to generate the records manager 18, e.g., as a bytecode file and the mapping aspect 20, e.g., as a bytecode file. These files 18, 20 may be separate or combined. The code files are deployed with the original application code 62 to implement privacy by default in the application without recompiling the original application. As will be appreciated, different software components can serve as the compiler for the records manager and mapping aspect or the compiler(s) may be combined into the generator(s) 52, 56.

In the method described herein, a distinction is made between source code, which refers to a human-readable (textual) representation of computer code, and bytecode, which is designed to be run on a virtual machine and is not human readable. As noted above, the code in files 18, 20, 62 may be bytecode, which may be bytecode for a virtual machine. That is, the bytecode is platform independent. The bytecode may then require further compiling to run on a specific application platform. In other embodiments, the application platform runs the bytecode without modification. Examples of bytecode include Java bytecode for running on a Java virtual machine and Common Intermediate Language (or Microsoft Intermediate Language) used in the .NET framework. Both of these bytecodes may be further compiled before running an application or compiled just in time (JIT).

The method will be described in more detail below, but, as an example, the application source code 36 may include an application record class 64 (the class may have a name such as "customer account"), which may include one or more fields 66, 68, 70. As an example, exemplary class 64 contains three fields: ID 66, name 68, and account reference 66. The user selects name 68 and account reference 66 as sensitive fields and the class 64 is therefore considered as a sensitive records class. Other fields in the sensitive class which are not selected by the user as being sensitive, such as ID 66, are need not be considered further (in the present case, the ID field is identified as the persistency key to be used by an external storage service to associate private clear values with the applicative records). The fields 66, 68, 70 are member variables of the class 64, but are referred to as fields because that term is commonly used when describing the variables at the bytecode level. The code generator 52 generates the RM source 14, which contains a class, called an RM class, containing a corresponding private record class for each application class 64 which has at least one sensitive field (member variable). Each sensitive field belongs to a class, and that class has a corresponding private class in the RM source 14. The corresponding private class has a member variable of the type of the sensitive class allowing objects of the corresponding private class to track objects of the sensitive class (which may be thought of as the "legacy" or "original" class). While only one is shown, it is to be appreciated that there may be at least two or multiple sensitive application classes 64, each containing at least one sensitive field (or perhaps more), and therefore there will be multiple corresponding private classes, one for each application class. The mapping aspect file 16 contains pointcuts at which the RM class 18 will augment the functioning of the application bytecode 62 to minimize the data in the sensitive fields 66, 68, 70, as explained further below. Each pointcut is a set of one or more join points. When the application bytecode reaches one of the join points described in the pointcut, the piece of code associated with the pointcut is executed which causes the data in the sensitive field(s) of the application record to be modified in such a way that they no longer contain information considered private.

The generated source may also contain code, not specific to the application, to cause a privacy manager 72 (see FIG. 2) to be loaded when the application is run. The privacy manager is a bootstrap class which loads configuration files, registers enforcement runner functions, and loads (or connects to an existing) minimization service. Enforcement runners are functions which, when a join is executed at a constructor or set function, look up which function is to be called for that class or field and call the function. They allow the join descriptions to be written generically and yet still call a particular function in a class of the records manager 14 by looking up the class that was constructed or field that was set in the join.

The system 10 may include a PC, such as a desktop, a laptop, palmtop computer, portable digital assistant (PDA), server computer, cellular telephone, pager, combination thereof, or other computing device or devices capable of executing instructions for performing the exemplary method or methods described herein.

The instruction memory 26 and data memory 30 may be separate or combined and may each represent any type of non-transitory computer readable medium, such as random access memory (RAM), read only memory (ROM), magnetic disk or tape, optical disk, flash memory, or holographic memory. In one embodiment, the memory 26, 30 comprises a combination of random access memory and read only memory. In some embodiments, the processor 22 and memory 26 and/or 30 may be combined in a single chip.

The I/O device 40 may include a network interface card which communicates with other devices via a computer network, such as a local area network (LAN), a wide area network (WAN), or the Internet, and may comprise a modulator/demodulator (MODEM). The digital processor 22 can be variously embodied, such as by a single core processor, a dual core processor (or more generally by a multiple core processor), a digital processor and cooperating math coprocessor, a digital controller, or the like.

With reference also to FIG. 2, the computer implemented execution system 12 includes main memory 80 which stores instructions 82 for performing the execution stage of the exemplary method and a processor 84 in communication with the main memory and with a data memory 86 for executing the instructions, all communicatively connected by a bus 88. Memory 80, processor 84, data memory 86 and bus 88 may be configured as for the corresponding hardware components of FIG. 1, except as noted. Elements that are also shown in FIG. 1 are accorded the same numerals.

The execution system 12 is configured to perform the second stage of the method which includes running the application bytecode 62 with the RM bytecode 18 and the mapping aspect bytecode 20. The bytecode files 18, 20, 62 may be run using the virtual machine 54 which either compiles the bytecode files to form native code (platform specific code) ahead of time or translates the code to native code as it is run (JIT). When the bytecode files 18, 20, 62 are loaded, they cause the privacy manager object 72 to be instantiated. This object is the bootstrap class which loads a gdpf configuration file, instantiates the record manager class, and either locates or instantiates a selected minimization service 92.

The system 12 may include, for example, a web server 94 which receives requests 96 over a network 98 via a network interface, such as a network interface card 100. The requests 96 may be generated by a remote user system 102, i.e., a system which seeks to have the private data in its records maintained private when information from the records is used, released or otherwise processed in a manner which could otherwise cause the privacy of the data to be compromised. The requests from the user system 102 may include a record to be processed with one or more fields including private data. For example, a user of the user system 102 may interact with the web server 94 which in turn calls the application bytecode 62 to create a new account which creates a new variable of the class application record 104, including populating fields (member variables of instance of class application record 104) such as ID 106, name 108, and account ID 100. Assuming that in the specification stage, the member variables name 108 and account ID 110 were designated as sensitive, then, when the application invokes either a constructor for the sensitive class application record 104 or sets one of the sensitive fields 108, 110, the pointcut in the mapping aspect bytecode 20 causes the records manager bytecode 18 to be invoked. This bytecode, using the method detailed with respect to FIG. 3, calls on the minimization service 92 to retrieve a corresponding private class 114 which computes or retrieves the values to be used as minimized values for the sensitive fields 108, 110 in place of the current field values. As will be appreciated, each field (or a group of fields) may be associated with a dedicated minimization service 92. Additionally, the system 12, rather than including the minimization service(s) may include a minimization service manager which calls on the trusted minimization services for the respective fields.

The system 12 may include an input/output device 118 which communicatively connects the system with an associated user interface device 120, which can be configured analogously to UI device 38, and which may allow a user to, for example, start and stop system 12.

FIG. 3 depicts a computer implemented method (which runs on a computer processing device) which may be performed with the system of FIGS. 1 and 2. The method begins at S100 of FIG. 3.

At S102, application source code 26 is received.

At S104, provision is made for a user to select (using UI device 38) one or more sensitive classes and/or fields within those classes. This may be done by the user, for example, entering a descriptive list manually. Alternatively, the user may use graphical tools integrated with the editor 42. For example, Xtext provides the ability to introspect all the java classes described in a classpath of the application source code 36. The application binary code may also be added as a library to the classpath to give the user the ability to select the personal record classes and their sensitive fields. This may be implemented, for example, by adding syntax in the Xtext specification of the gdpf grammar 50:

--- generate gdpfDsl "http://www.xco.com/ea/privacy/gdpf/GdpfDsl"
import "http://www.eclipse.org/xtext/common/JavaVMTypes" as types
...

---

As an example, the following grammar rule may be added to match possible personal records:

---

PersonalRecord:
    name=ID 'mapped-to' nativeClass=([types::JvmDeclaredType | FQN])
    ('persitency keys :' (idFields += [types::JvmField])+)?
    'FieldsToProtect :[' privateFields += PrivateField+ ']';

---

The resulting editor provides a way to identify the sensitive classes directly. A more detailed example gpdf specification is shown in FIG. 4. Such an extended BNF form, used in XText technology, assists in generating a textual editor able to follow the rules and validate the output.

As examples of the user selection, FIG. 5 shows a screen shot of an "account" class being selected by a user using dropdown menu 122 and FIG. 6 shows the fields "address" (which accepts address data) and "bankRef" (which accepts bank reference data, such as an account number) being selected as sensitive using dropdown menu 124.

Using the editor 42 augmented by the grammar 48 to identify records and fields, the service architect may quickly specify the sensitive records and fields and, optionally, select a minimization service 92, which is to be responsible for managing the sensitive field value. In one embodiment, the definition of the minimization service includes its name and/or IP address. The minimization service 92 may also be identified by the class used to minimize values and/or the degree of opacity/transparency to apply to fields. For a given minimization service, two or more levels of opacity may be presented to the user, allowing the user to select an appropriate one of the levels for each field. If the user does not select a minimization service 92 to be used for a field designated by the user as sensitive, the system 10 (or 12) provides for the identification of an appropriate default minimization service.

The domain-specific language generator XText also provides the ability to parse the textual content of the application specification 36 and associate parsed elements with an object model 50 generated from the grammar. This provides the advantage to treat such a parse resource in textual mode within the editor or in object mode whenever required. Using XText with Java is convenient, but other grammars and editors may be used.

The system receives the user's selections at S106. The model 50 is then validated.

At S108, the RM class file 14 is generated. An example RM class (with the full name "TestApplicationGpdfPrivateRecordsManager" is shown in FIG. 7. This example of an RM class extends the generic PrivateRecordsManagerRuntime, in charge of generically supporting records management. The implementation of this class mainly registers enforcers (functions which are called by mapping aspect code 20 when objects of sensitive classes are created or sensitive fields are modified) per sensitive class or field and retrieves them when needed. The source code of the registration is exemplified in FIG. 8.

As an example, for the legacy class 64 called "account," the records manager class 14 may include the following four elements in order to operate:

1. a PrivateAccount class, which is defined to embed the account legacy class. This class is statically decorated with the gdpf metadata, such as the privacy ID, and provides a generic "minimizeStringField" method to be used by all the textual sensitive fields in write mode. A corresponding method could be used for images or sound fields. This method discovers the field enforcement runner (fieldEnforcementRunner) initialized by the configuration of the application, and returns the minimized value to the application.

2. a mapRecordToPrivateRecord method handles all the records pointed out by the gdpf model. This method will be used by the application, either explicitly or by mapping aspect.

3. a getPersistencyKey method translates the persistency specifications of the model 50 into a piece of code, so that the field external storage can also store it in a persistent way if needed.

4. a configureRecordClass, called by the configuration bootstrap, checks that the generated classes match the interfaces of the gdpf model loaded by the application.

The RM (RecordsManager) class may be generated from the gdpf design via a command available within the editor 42. This command runs a code generator, and the generated class file code is compiled and deployed together with the application to become operational.

If the code is not auto-generated, similar protections can be gained by coding similar classes by hand. If re-compiling the application is acceptable, wrapper classes can be added to the existing sensitive classes.

Generating the code in this way is not of course, essential, but provides a guarantee that policy and enforcement are aligned. This is helpful to minimize time spent modifying the application and, therefore, the cost of using the privacy policy. The generated code itself is equipped with a verification that at runtime the considered policy is the one used at generation time. Details of the generator 52, based on the gdpf model, are illustrated in FIG. 9 in Xtend syntax.

The generator 52 generates a corresponding private class (PrivateRecord) for each of the sensitive application classes 64 (userClasses) of the gdpf model 50 (PersonalRecord type), by setting the static gdpf metadata and associating the dynamic configuration elements to this class at runtime. Also, this class centralizes the dispatch of 'PersonalRecord' creations.

Returning to FIG. 3, in step S108, the minimization service 92 is also specified. FIG. 10 illustrates an example specification 180 for the minimization service 92 and the definition 182 of the sensitive class 64 and fields 106, 108, 110 (specified by the user as described above).

The example of FIG. 10 expresses a design named privacy.generic.framework.testApplication.M1.m0.i1 associated with the version M1.m2.13 of the service standalone_test_v1_0_9. Header 180 provides the metadata of the design itself, which in this case is the list of only one element. The sole element "minim" is selected as the default minimization service to use for the private objects from a list of minimization services to consider. It is followed by the list 182 of sensitive record types (in this case, only one type: test.privacy.Account) and fields of that type of record to be minimized (address, name and bankRef). The fields address, name, and bankref objects of type test.privacy.Account will be minimized by the default minim service 92. The minim service is responsible for the persistent storage of the actual values of the minimized fields, allowing the real values to be used, under strict control.

In one embodiment, a data minimization engine (DME) service class represents the definition of the minimization service 92. The service definition may be a simple registration of an already deployed service. An example minimization service interface definition 188 is shown in FIG. 11. The service architect optionally implements a service class with the user interface to designate the minimization service to carry out the privacy policy.

At runtime, the convention is that the enforcement support (privacy manager 72) will look for a service name or location matching the description, implementing the desired algorithm and providing the expected levels of opacity (these elements can be checked with the embedded DMEService structure of the service). Whenever a field specified as private has no associated minimization service, the one provided as the default will be used and, if no default minimization service is defined, the minimization service can be a default volatile embedded minimizer.

The way in which the data is minimized depends on the type of data and the degree to which it is considered private. For example, in an address field, the street address part, such as the house number and name of the street, may be considered private data and thus removed or replaced with a generic descriptor such as "street address," (i.e., providing a high privacy level) while the city and/or state may be considered sufficiently generic as not to be considered private, and thus is not modified or is minimally modified.

At step S110, the aspect code is generated. The aspect generated file is there to intercept calls to the constructor of the sensitive classes (e.g., the account class) or calls to set the sensitive fields (e.g. Name) and insert calls to functions of the generated Records Manager class to manage the records pointed to as sensitive in the model 50. An example file for the aspect source code 16 is shown in FIG. 12. An example aspect code generator 56, in Xtend, is shown in FIG. 13.

The aspect code generator 56 provides two additions to the original application: (1) After each record creation of an Account record, the record is mapped to a PrivateRecord via the registered records manager (PrivateRecordsManager) and (2) when accessing a sensitive field in write mode, the field value is switched with the minimized one provided by the enforcement support via the same registered PrivateRecordsManager.

At S112, the RM source code 14 is compiled, by the compiler 58, to form the RM bytecode 18. The aspect source code is also compiled, by the compiler 58, to form the aspect bytecode 20. At S114, the compiled RM bytecode 18 and compiled aspect file bytecode 20 are deployed with the application.

This ends the specification stage.

In the enforcement stage, at S116, the application is run. When the application is run, several other objects, defined before, after, or in parallel with the method of FIG. 3, may also be instantiated, discussed below.

At S118, the method ends.

One object which is instantiated during the enforcement (S116) is the privacy manager 92, which handles the delegation of the functions from the joins for sensitive fields and connects to the minimization services specified in the configuration file. Some dedicated enforcement runners may be generated at record/field access time, consulting the specification resource and discovering the expected services, as well as configuring the network connection security. Whenever it is not feasible to connect with such a service, a privacy exception may be raised at access time.

The privacy manager 92 associates an EnforcementRunner instance with each PersonalRecord by requiring the RM 18 to configure each EnforcementRunner with a FieldAccessEnforcementRunner. In particular, each FieldAccessEnforcementRunner instance will delegate the plain field value management to the minimization service provided in the gdpf model 50. This enforcement part may be provided in a generic way and hence can be automatically generated. If hand coding is used, the application-specific work involved may entail embedding the application record in a PrivateRecord at record creation time. If using aspect programming, then joins can be used to attach code to each constructor and set function, eliminating the need for manual coding.

The privacy manager 92, at the start phase of the enforcement application, may be initialized in two ways. First, the privacy manager 92 is given an application-specific RM (called PrivateRecordsManager in the code provided) that is specific to the application. Second, the privacy manager 92 also loads the gdpf model 50, providing the privacy-by-default policy to apply to the application. The privacy manager 92 needs to know which minimization services to apply to each function and where to find them. This information is retrieved either from the user selection file or is in the generated code of the RM 18. It may also be in a separate configuration file or retrieved from a network location at runtime. Generally, the privacy manager 92 first initializes a configuration manager 194 (FIG. 19), and then initializes the enforcement. The role of the configuration manager is to establish the link between privacyIDs and gdpf model:

```
@Override
public void initPrivacyConfigurationManager(Gdpf model) throws
PrivacyConfigurationException {
    configurationManager.addPrivacyConfiguration(model);
    hookPrivateRecords(configurationManager);
}
```

A hookPrivateRecords support code calls the configureRecordClass for each of the userClasses pointed out in the gdpf loaded model 50. The hookPrivateRecords checks that the classes are the same between the model 50 and the configuration manager to ensure that both the model and the corresponding specific code are dealing the same record classes:

```
For (Personalrecord recordClass :
configurationManager.getPrivacyConfiguration( ).getDefinition( ).getUserClass
es( ){
    configurationManager.addPrivacyConfiguration(model);
    hookPrivateRecords(configurationManager);
}
```

Once this check is done, the enforcement support is performed at record manipulation time. The hooking of record classes may include calling the mapRecordToPrivateRecord (record) provided by the specific PrivateRecordsManager and running record operations through the returned PrivateRecord. In one embodiment, this is done via aspect programming by calling the mapRecordToPrivateRecord(record) in constructors or set functions. In other embodiments, this may be added to the application source code, if recompiling is acceptable.

Figure 14A:
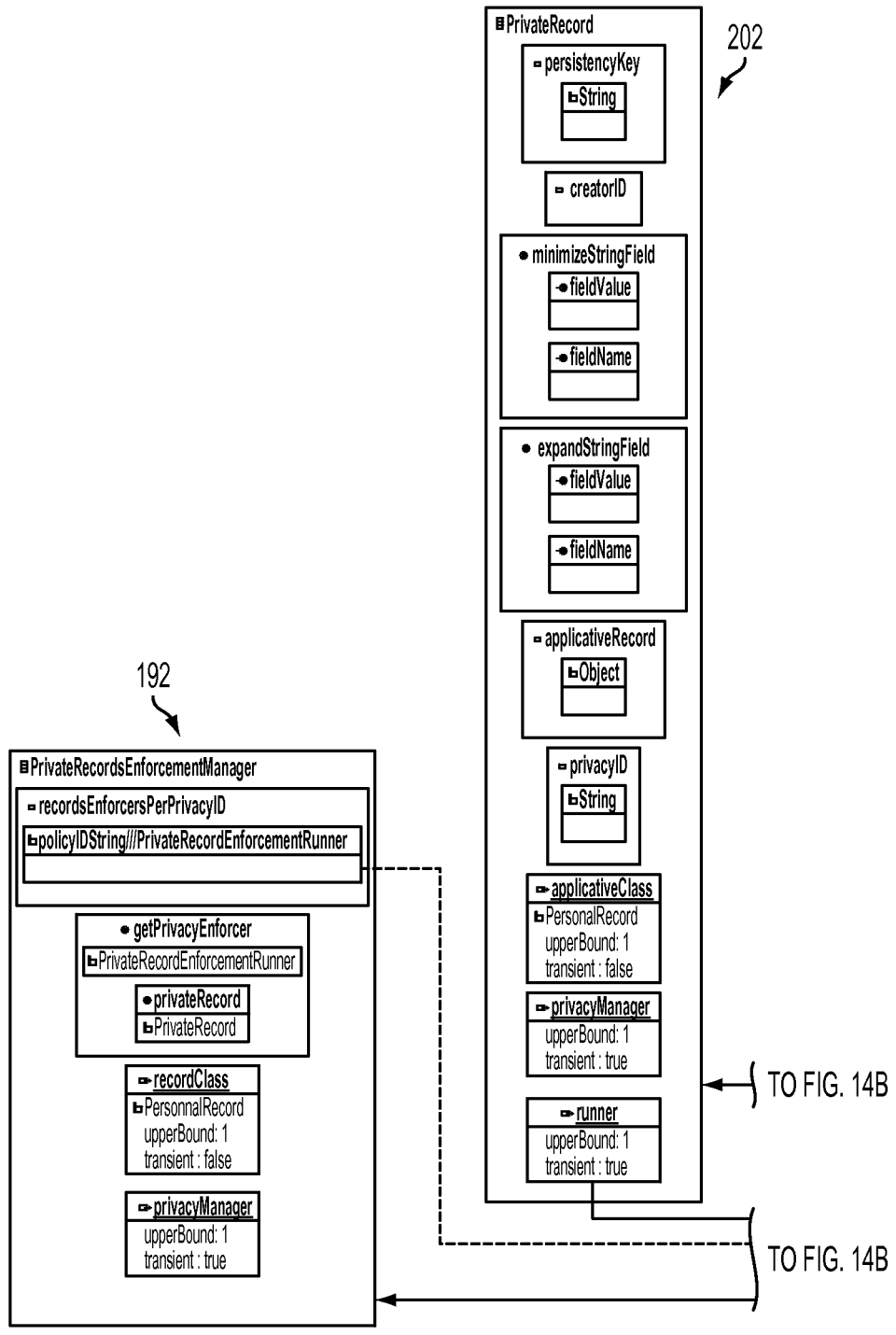
FIG. 14 (split into FIGS. 14A and 14B) illustrates an example architecture for parts of the execution system of FIG. 2, in accordance with one aspect of the exemplary embodiment.
Figure 14B:
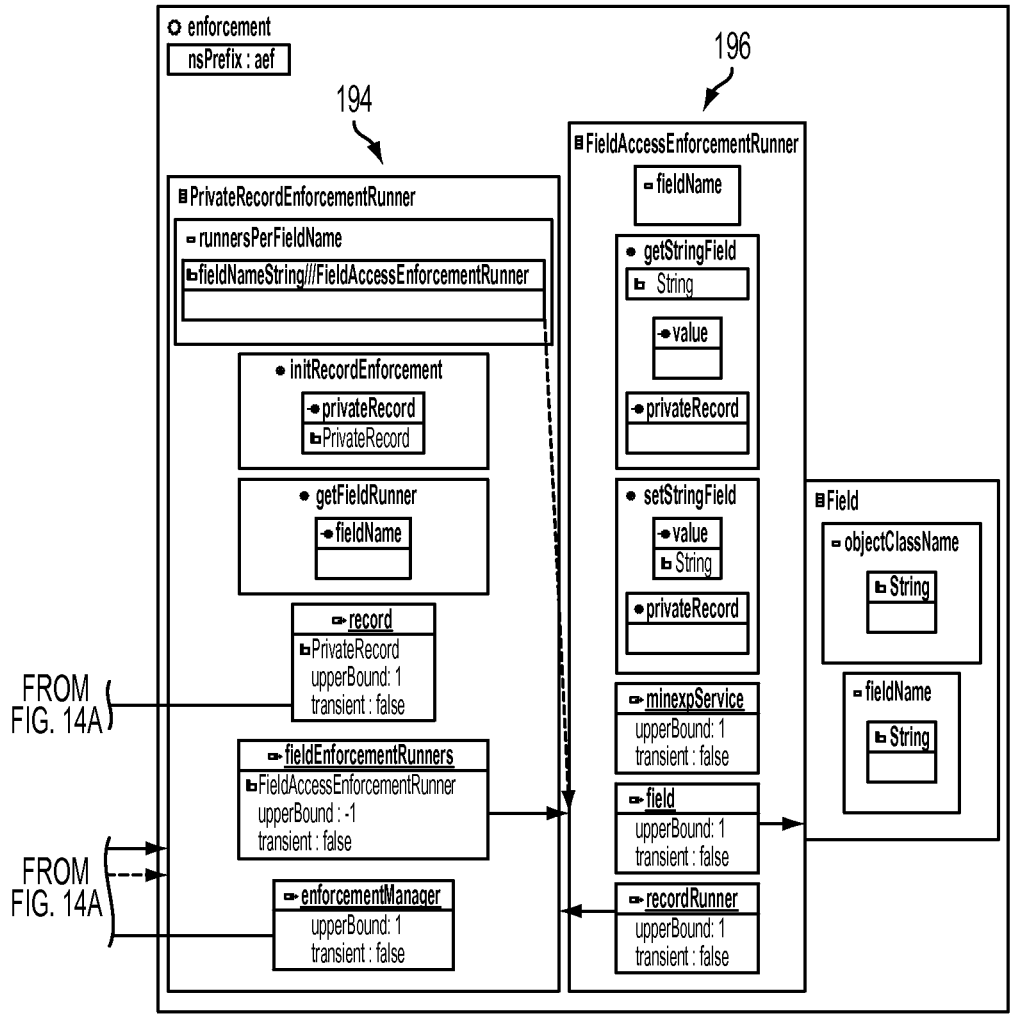

If the returned PrivateRecord does not carry a runner (PrivateRecordEnforcementRunner 194) (FIG. 14), then a runner is associated with it, either by retrieval or by creation. The RecordsManager class (PrivateRecordManager in the code) contains a table of PrivateRecordsEnforcementManager 190, one per PersonalRecord class (FIG. 14). If no enforcement runner exists, a new enforcement manager may be created (FIG. 15).

The runner is registered in a table with a corresponding policyID to be used at the time of record creation. For example, if an application could run with a policy M1.m2.i2 and retrieves a record created with an M1.m2.i0 policy, the application should run with the policy specified at creation time, not with the current one. Accordingly, there may be multiple available runners for a given PersonalRecord. The identification of the policy to consider is the responsibility of the RecordsManager at map time (FIG. 16).

To proceed with the RecordEnforcementRunner initialization, if none was discovered for the record, then the enforcement manager associated with the PersonalRecord will create one, and register it with the recordPolicyID (FIG. 17). To create such a runner, the FieldAccessEnforcementRunners 196 (FIG. 14) for sensitive fields associated with the PersonalRecord in the privacy-by-default model to consider are retrieved using the specified gpdf model 50 (FIG. 18).

The FieldAccessEnforcementRunner 196 also follows the minimization service specification of the model. This may be achieved by first identifying the service, taking into account a default one if none has been provided, or even using an embedded one if no default service is given in the specification (FIG. 19).

Figure 20B:
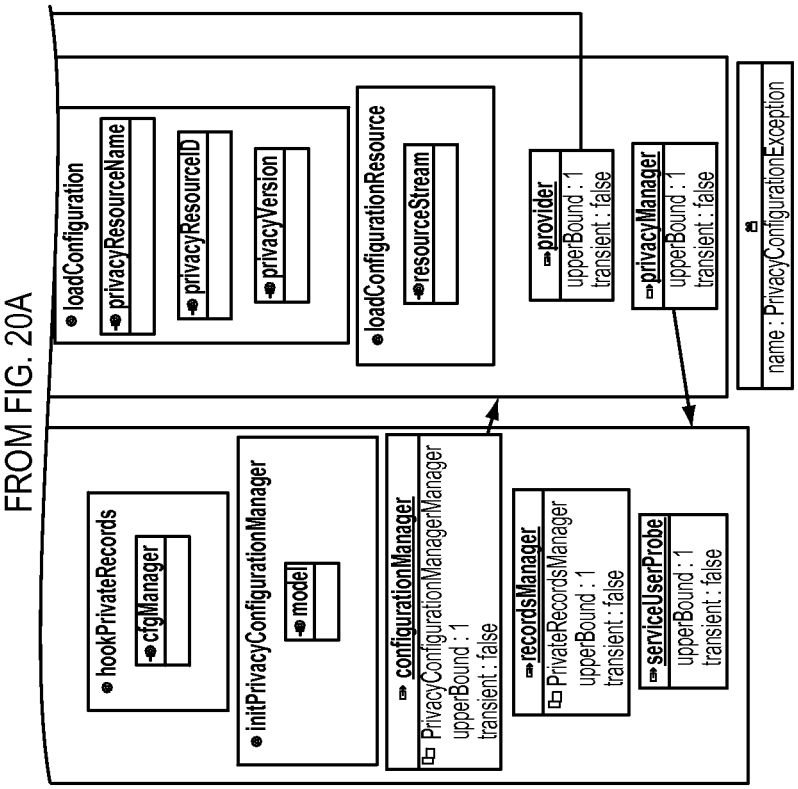
FIG. 20 (split into FIGS. 20A and 20B) illustrates an example architecture of an enforcement support.

A privacy configuration manager 198 (PrivacyConfigurationManager) (FIG. 20), employed by the privacy manager, manages the load in memory of privacy resources through registered privacy configuration (PrivacyConfiguration) objects. PrivacyConfiguration is a basic type representing a gdpf model loaded in memory. Such a gdpf model is the one pointed by the definition attribute of a PrivacyConfiguration object. The loading of XText resources automatically generates a gdpf model in memory. The 'definition' field points to the EMF model (parsed and semantized form of the text of the privacy-by-default model) while the other fields are metadata with respect to resource management. Other approaches are contemplated, such as using XML files or other structured files.

The privacy configuration manager 198 provides a getPrivacyConfiguration(privacyID) function which is able to look in the resources (for example, available in the classpath) for the one containing the desired privacy-by-default model, based both on the internal name of the found resource and a resource path convention. All this is hooked on the initialization of the configuration manager setting the package and name of the model. The privacy configuration manager manages the list of available privacy configurations after having loaded them.

As discussed above, the framework allows multiple minimization services to be used to implement different policies for different fields. The framework also allows the minimization service to be specified or provided by default. If no Minimization service is declared in the gpdf model, a volatile Minimization service will be created which will lose the plain value of the delegated fields when it is garbage collected. This should rarely happen, but does implement, somewhat drastically, privacy-by-default. Everything private is made fuzzy with no way to retrieve the information after the minimization service is released.

Alternatively, a minimization service is declared. In this case, there are two cases. In the first case, an IP address is associated with the node attribute of the service declaration. This means that the Minimization is an instance external to the extended application, to be addressed through r-osgi communications, or other remote service discovery/interaction framework. In this case, the node is secure so no particular security must be used during the communication. The PrivateRecordEnforcementRunner 194 will create FieldAccessEnforcementRunners 196 looking for Minimization services in the service directory for the requested name and IP address.

If a minimization service is declared, but no IP address is associated with it, then a local persistent service may be looked for. A localPersistentFieldAccessEnforcementRunner is generated, managing two different cases of services: No local OSGi and local OSGi. If no local OSGi service can be discovered, then a default LocalMinexpService instance is embedded in the application extension itself, provided the application initialized a general context of persistency. If a local OSGi service is discovered, then the minimization request is transmitted to this local service.

For an example of providing an IP address to the minimization service and for a local OSGi service, see FIG. 21. The setString(value, record) request will be relayed to the minimizeString method of the associated minexpservice of the runner, be it embedded or discovered. Example code for this is shown in FIG. 22. The DME service name and gdpf version can be used at registration time to provide many different services of the same type of service could be registered locally or remotely.

As an example of step S106, the Account record identified as sensitive, has the following (java) definition, with persistency characteristics, and fields named 'name', 'address', 'age' and 'bankRef', as shown in FIG. 23.

The running system 12 may be extended with an add-on translating the privacyByDefault specification. The support framework addresses to the need to translate, as easily as possible in terms of development cost, the above design in a runtime configuration of the system.

Typically, at runtime, Account records are embedded by the PrivateAccount class, itself part of the RecordsManager 18, described above, and the setting of sensitive fields may be redirected to a minimizedStringField 202 in the private record (FIG. 14). This makes a link with the specification sensitive support which will attach the right service to the runner.

Once this mapping from sensitive class (or legacy class) to corresponding private class (defined in the RecordsManager class) has been done, the support framework connects the RecordsManager class to the specified minimization services for the sensitive record fields.

The support framework is also responsible for collecting contextual data to help the mapping. Typically, the record mapping function needs help identifying the actual application user at the record creation time. An advantage of the method is that a minimization service 92 is attached to each delegated field. Different fields may have different minimization services, even in the same application or even class. Each minimization service may implement different policies, allowing each field to be controlled by a different policy. The privacy manager 72 is responsible for the requested context and enforcement of record fields minimization. Such a privacy manager, initialized with the explicit name of the policy deployed by the service provider, can be coupled to the system 12, and the records mapping will then inherit from this configuration.

The record manager 18 may provide two functions:
(1) It tracks the creator and the gdpf metadata at each record creation.
(2) It enforces the requirement that the fields are only modified by the specified minimization service.

The RecordsManager maps each created record corresponding to a PersonalRecord pointed to by the privacyByDefault model 50 to a PrivateRecord in the application memory. This private record extends the application record with extra information such as the privacy metadata.

As illustrated in FIG. 2, the output of the execution system 12 may be one or more modified application records 210 in which the sensitive data has been minimized. The original data, extracted from those sensitive fields, is maintained by the system, separate from the records from which it is extracted, e.g., in an associated database 212, from where the original data can be retrieved when needed (e.g., for specified actions authorized by the owner of the private data). This satisfies the needs for such service providers to delegate the storage of sensitive parts of persistent records to a different storage unit, while the legacy record itself is minimized.

The term "software" as used herein is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on the server or other location to perform certain functions.

The method illustrated in FIG. 3 may be implemented in a computer program product that may be executed on a computer. The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIG. 3, can be used to implement the method.

As will be appreciated, the steps of the method need not all proceed in the order illustrated and fewer, more, or different steps may be performed.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:
1. A method for implementing a privacy policy, comprising:
receiving code for an application which includes definitions for a set of classes of records and for each of the record classes, a definition of at least one field; receiving a selection of at least one of the fields of the application that is designated by a user as a sensitive field;

with a hardware processor, based on the selection, generating a records manager and a mapping aspect, the records manager including a private class definition corresponding to each record class that includes at least one of the fields designated as a sensitive field, the private class definition identifying an associated minimization service for generating a minimized value of data in the sensitive field;

the mapping aspect including pointcuts for identifying joins at which the records manager is to augment the functioning of the application code by calling the minimization service to generate a minimized value of data in the respective sensitive field, the records manager and mapping aspect being configured to be deployed when the application is run, whereby the minimization service generates a minimized value of data in the respective sensitive field;

wherein the mapping aspect includes a pointcut which identifies a join point for each sensitive field;

further comprising with a grammar, generating a model of the application which lists the sensitive fields and tracks the record classes which contain the sensitive fields, the generating of the records manager comprising generating a records manager source file based on the model.

2. The method of claim 1, further comprising deploying the records manager and mapping aspect when the application is run.

3. The method of claim 2, wherein when the application is run, the data in the sensitive fields is extracted and replaced with respective minimized values and the extracted data is stored separately from the application records.

4. The method of claim 1, wherein the application comprises bytecode which is executable by a virtual machine, the virtual machine being executed by a computer processing device.

5. The method of claim 1, wherein the receiving a selection of at least one of the fields comprises generating a user interface which proposes some of the fields defined in the application for selection by a user as sensitive fields.

6. The method of claim 5, wherein the user interface comprises a source code editor.

7. The method of claim 5, wherein the generation of the user interface includes applying a grammar which matches a plurality of field definitions in the source code for the application.

8. The method of claim 1, further comprising providing for user selection of a minimization service for at least one of the fields designated as a sensitive field and wherein when a minimization service has been selected for a field designated as sensitive, the records manager calls on the selected minimization service and otherwise calls on a default minimization service.

9. The method of claim 1, wherein the records manager includes a private class definition for each sensitive class.

10. The method of claim 1, wherein the generation of the records manager comprises converting the records manager source code to bytecode.

11. The method of claim 1, wherein the records manager class further comprises a mapping function configured to retrieve an instance of a private class by looking up an instance of the sensitive class.

12. A system for implementing a privacy policy, comprising: memory which stores code for an application which includes definitions for a set of classes of records and for each of the record classes, a definition of at least one field;

an editor for receiving a selection of at least one of the fields of the application that is designated by a user as a sensitive field;

a records manager generator which generates a records manager, the records manager including a private class definition corresponding to each of the records classes that includes at least one of the fields designated as a sensitive field, the private class definition identifying an associated minimization service for generating a minimized value of data in the respective sensitive field;

a mapping aspect generator which generates a mapping aspect, the mapping aspect including pointcuts for identifying joins at which the records manager is to augment the functioning of the application code by calling the minimization service to generate a minimized value of data in the respective sensitive field, the records manager and mapping aspect being configured to be deployed when the application is run, whereby the minimization service generates a minimized value of data in the respective sensitive field; and wherein the mapping aspect generator generates a mapping aspect include a pointcut which identifies a join point for each sensitive field;

a editor using a grammar, generates a model of the application which lists the sensitive fields and tracks the record classes which contain the sensitive fields, the generating of the records manager comprising generating a records manager source file based on the model;

a processor which implements at least one of the editor, records manager generator, and the mapping aspect generator.

13. The system of claim 12, further comprising a compiler which compiles bytecode for the records manager and the mapping aspect from source code.

14. The system of claim 12, further comprising a user interface which receives a selection of fields including the sensitive field.

15. The system of claim 12, further comprising a privacy manager which calls the minimization service when the application is run.

16. A method for implementing a privacy policy, comprising:

providing in memory a records manager and a mapping aspect, receiving code for an application which includes definitions for a set of classes of records and for each of the record classes, a definition of at least one field;

receiving a selection of at least one of the fields of the application that is designated by a user as a sensitive field;

records manager including a private class definition corresponding to each record class of an application that includes at least one field that has been designated as a sensitive field, the private class definition identifying an associated minimization service for generating a minimized value of data in the sensitive field;

the mapping aspect including pointcuts for identifying joins at which the records manager is to augment the functioning of code of the application by calling the minimization service to generate a minimized value of data in the respective sensitive field; and wherein the mapping aspect includes a pointcut which identifies a join point for each sensitive field;

further comprising with a grammar, generating a model of the application which lists the sensitive fields and tracks the record classes which contain the sensitive fields, the generating of the records manager comprising generating a records manager source file based on the model;

with a hardware processor, deploying the records manager and mapping aspect together with the application code, whereby the minimization service generates a minimized value of data in the sensitive field.

* * * * *